May 28, 1957
J. T. ZAK
2,793,808
RECTILINEAR SLIDE RULES
Filed May 9, 1956
3 Sheets-Sheet 1
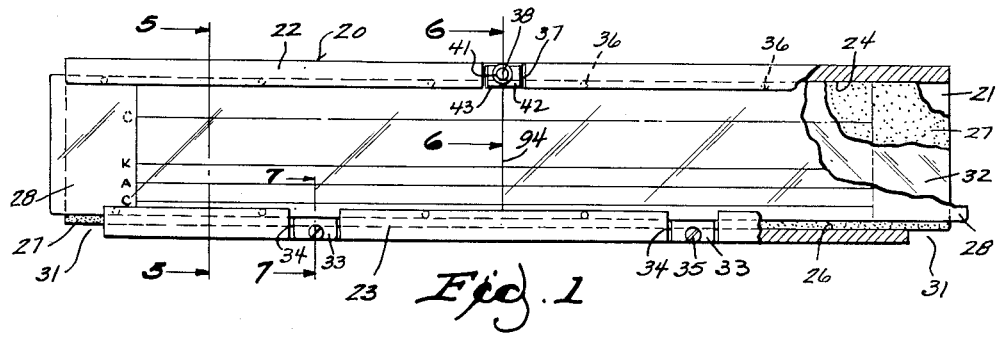
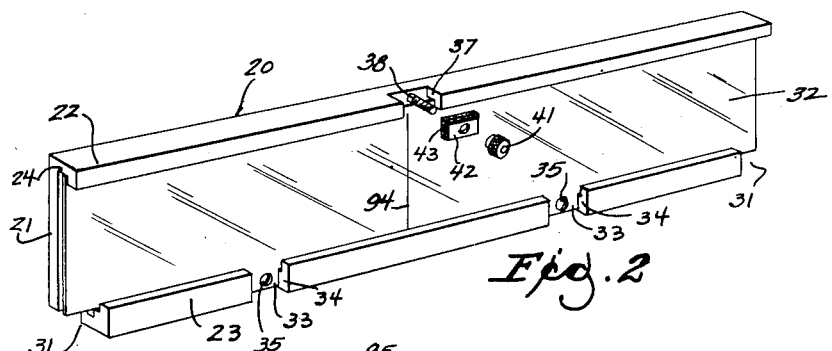
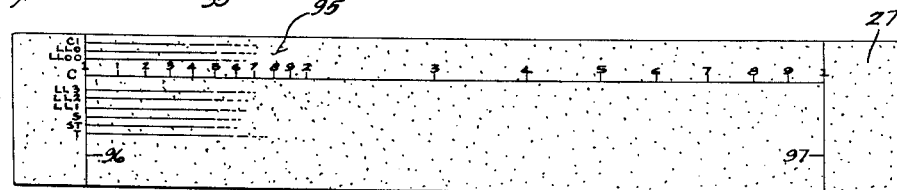
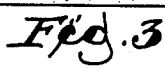
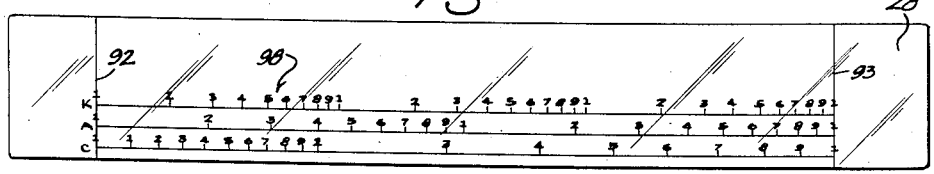
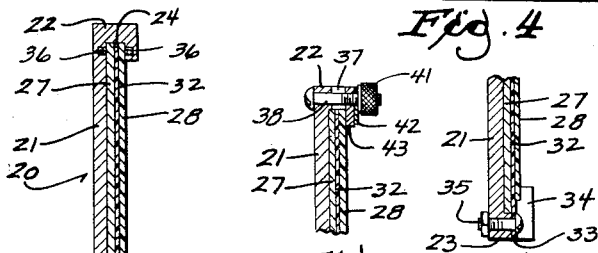
INVENTOR.
JOSEPH T. ZAK
BY
Wheeler, Wheeler & Wheeler
ATTORNEYS

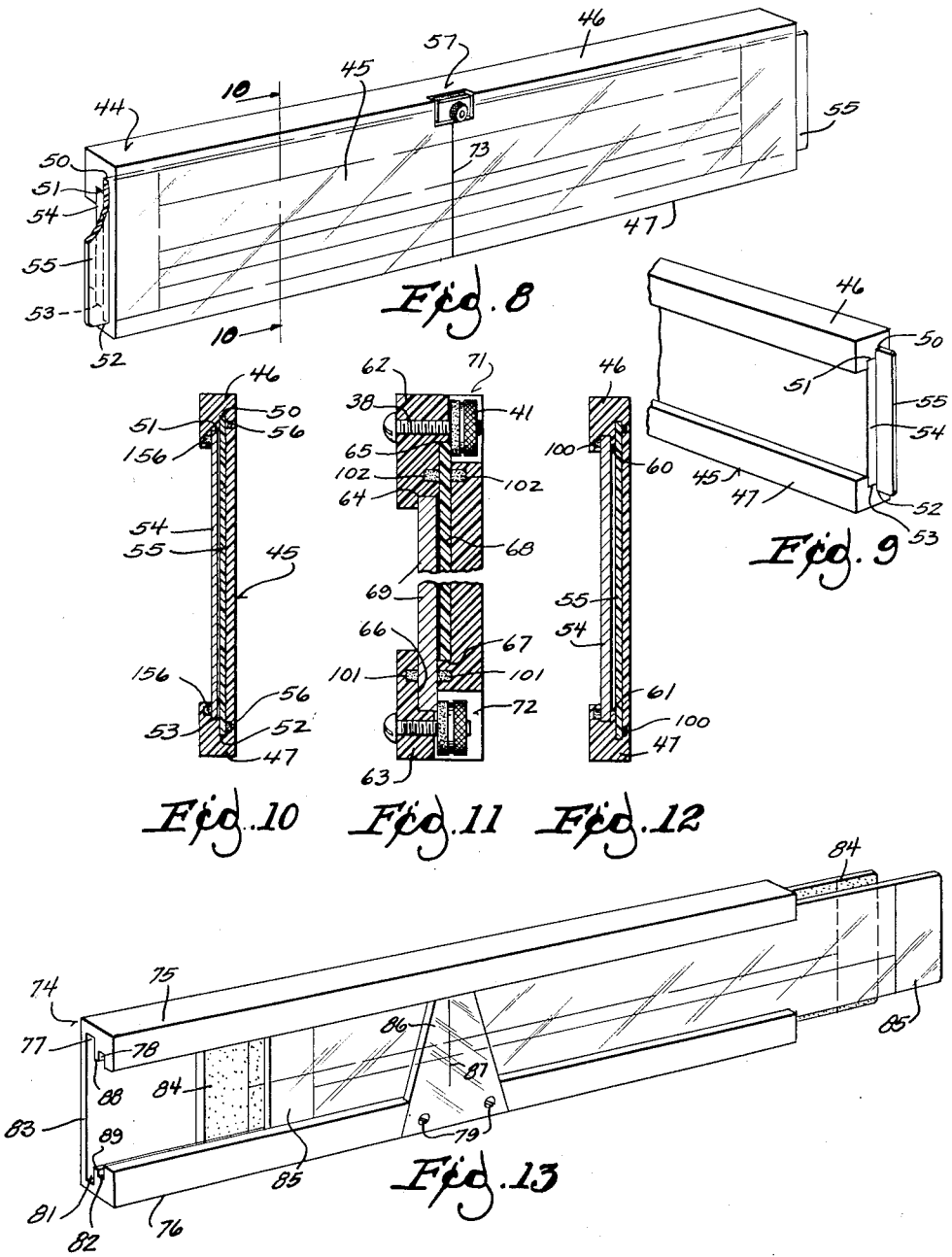

INVENTOR.
JOSEPH T. ZAK
BY
Wheeler, Wheeler & Wheeler
ATTORNEYS

United States Patent Office 2,793,808
Patented May 28, 1957

2,793,808

RECTILINEAR SLIDE RULES

Joseph T. Zak, Lemon Grove, Calif.

Application May 9, 1956, Serial No. 583,845

17 Claims. (Cl. 235—70)

This invention relates to improvements in rectilinear slide rules.

Cross reference is made to my copending application Serial No. 313,128, now Patent No. 2,746,682.

The present invention relates to changes in the mechanical structure of the slide rule disclosed in my copending application aforesaid, changes in the scale arrangement and changes in the operation of the rule. In the instant application I disclose a rectilinear slide rule frame having marginal flanges with stepped or offset slideways in which the several slides of the rule are mounted in face to face relation for relative rectilinear movement, the edge margins of the slides being in stepped or offset relationship to expose the edge margin of a slide for finger access.

In the devices of the present invention I may inscribe scales on both slides with which the rule is provided. This arrangement is a departure from the device of my copending application aforesaid in which all scales are inscribed on one slide, the other slide being used solely as a cursor. The provision for scales on both slides enables solution of certain mathematical problems with the minimum number of slide manipulations.

In the device of the present invention both slides combine the functions of scale and cursor. The relationship between the cursor indicating lines on one slide and the scales on the other slide is such that the cursor lines sweep over all of the scales during relative movement between slides. Accordingly, any scale on one slide may be directly interrelated to any scale on the other slide through the medium of the appropriate cursor line, the reading therebetween being effected directly and without need for such additional cursor movement as characterizes the conventional Mannheim slide rule.

The devices of the present invention incorporate improved braking means for imposing frictional drag on the respective slides independently or for locking all slides together, in either intermediate or final position.

Other objects and advantages of the invention will be more apparent to one skilled in the art upon examination of the following disclosure in which:

Fig. 1 is a front elevation of one embodiment of my improved slide rule, both slides being mounted in the frame.

Fig. 2 is a perspective view of the frame with the slides removed.

Fig. 3 is a front elevation of the scale bearing slide which is rearmost in Fig. 1.

Fig. 4 is a front elevation of the scale bearing slide which is foremost in Fig. 1.

Fig. 5 is a cross sectional view taken along the line 5—5 of Fig. 1.

Fig. 6 is a fragmentary cross sectional view taken along the line 6—6 of Fig. 1.

Fig. 7 is a fragmentary cross sectional view taken along the line 7—7 of Fig. 1.

Fig. 8 is a front perspective view of a modified embodiment of the invention.

Fig. 9 is a fragmentary rear perspective view of the device shown in Fig. 8.

Fig. 10 is a cross sectional view taken along the line 10—10 of Fig. 8.

Fig. 11 is a cross sectional view taken through a modified embodiment of the invention.

Fig. 12 is a cross sectional view taken through a still further modified embodiment of the invention.

Fig. 13 is a front perspective view of a still further modified embodiment of the invention.

Figure 14:
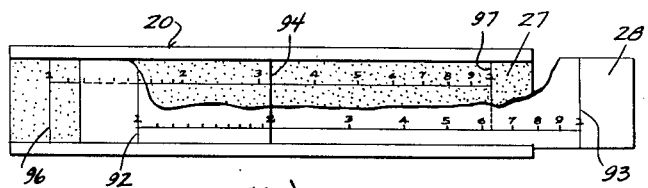
Figs. 14 through 17 are diagrammatic views showing various steps in the positioning of the respective scale bearing slides in the course of solving illustrative multiplication and division problems.

The embodiment of the invention shown in Figs. 1–7 comprises a channel-shaped frame 20 which may have a closed back wall or web 21 with marginal upper and lower flanges 22, 23. Upper flange 22 is provided with a relatively broad undercut groove or slideway 24. Lower flange 23 is provided with relatively narrower stepped grooves or slideways 25, 26. As suggested in Fig. 13, stepped grooves can optionally be provided in upper flange 22, in addition to the stepped grooves in the lower flange.

A first slide 27 which is rearmost in Fig. 1 is mounted for longitudinal movement in the slideways and has its upper margin in slideway 24 and its lower margin in slideway 25. A second slide 28 which is foremost in Fig. 1 and in face to face relationship with slide 27 has its upper margin in slideway 24 and its lower margin in slideway 26. Slide 28, accordingly, is slightly narrower than slide 27, the lower margin of slide 27 extending beyond the lower margin of slide 28. Slide 27 is desirably slightly longer than frame 20 so that its end margins protrude slightly for finger access when the rule is closed.

Slide 28 may optionally be somewhat shorter than slide 27 and the lower flange 23 of the frame 20 is relieved at 31 at both its ends so that when the slide rule is closed, portions of the lower margin of wider slide 27 are exposed below the lower margin of the narrower slide 28 for finger access. Accordingly, in all positions of use, and notwithstanding the closed back of the frame, portions of both slides are exposed for finger access.

As in the device of my copending application aforesaid, I provide a partition 32 which intervenes between slides 27, 28. Partition 32 may be anchored in place by means of laterally extending lugs 33 which extend into appropriate recesses 34 formed in lower flange 23 and are anchored thereto by nuts and bolt means 35 as best shown in Figs. 1 and 7. Partition 32 bears mid-indicator line 94.

The slideways 24, 25, 26 may be so accurately finished in the manufacturing thereof to hold the slides 27 and 28 and the intervening partition 32 relatively snugly so that the slides will be held by friction against displacement from positions to which they are moved during the course of slide rule operation. However, I may optionally provide the walls of the slideways with series of longitudinally spaced friction plugs or pads 36 of suitable friction material such as felt, rubber, etc., to impose frictional drag on the respective slides, thus to hold the slides against inadvertent slippage. For the same purpose I may optionally line the slideways with a friction coating such as rubber, etc.

Figure 18:
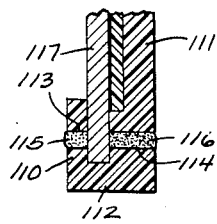
Fig. 18 is a fragmentary cross section through a typical slide rule embodiment of the invention and showing the preferred friction plug structure.

The preferred friction plug structure, optionally usable in all embodiments of the invention, is shown in Fig. 18. The respective slideway flanges 110, 111 of frame 112 are apertured at 113, 114 completely therethrough to receive the friction plugs 115, 116. Thus the plugs 115, 116 are readily emplaced in the frame by inserting them through apertures 113, 114 and their pressure on slide 117 readily adjusted by advancing and retracting them in apertures 113, 114.

I may also optionally provide upper flange 22 of the frame with a recess 37 whereby to expose the upper margins of the underlying slides 27, 28. In the recess I may mount a friction brake comprising bolt 38 having a nut 41 which bears through washer 42 against a pad 43 of friction material to press against the exposed margins of the slides aforesaid. By turning down the nut 41 sufficient pressure may be applied to the pad 43 to lock both slides in any position to which they have been previously adjusted. By applying varying degrees of reduced pressure, the device will act as a brake having adjustable frictional drag on the slides. As the parts wear, the pressure on the pad 43 is easily adjusted to maintain the frictional drag on the slides at an optimum amount.

In Figs. 8, 9 and 10 I disclose a modified embodiment of the slide rule in which the channel-shaped frame 44 has a back which desirably is sufficiently open to provide finger access to the rear face of slide 54. The rule has a transparent web or closed front wall 45 having marginal flanges 46, 47. Flange 46 is provided with stepped grooves or slideways 50, 51 and flange 47 is provided with stepped grooves or slideways 52, 53. The slide 54 which is rearmost in Fig. 8 is mounted in grooves 51, 53. Slide 55 which is foremost in Fig. 8 is mounted in grooves 50, 52. For reasons hereinafter explained, slide 54 is desirably thinner than the depth of grooves 51, 53 to avoid contact of slide 54 with slide 55 when the rule is held horizontally with slide 55 uppermost.

In this embodiment of the invention, rearmost slide 54 is narrower than foremost slide 55 and is accessible to the operator's fingers through the open back of the frame. The grooves in both flanges 46, 47 are stepped so that both upper and lower margins of the wider slide 55 are exposed beyond the margins of the narrower slide 54 and the edges of the slide 55 may be grasped without concurrently grasping the edges of slide 54. Slide 55 is desirably longer than the frame 44 so that when the slide rule is closed the end margins of slide 55 project for finger access.

This embodiment of the invention is also optionally provided with a slideway lining or friction plugs 56 for slide 55 and 156 for slide 54. I also show at 57 an adjustable friction brake which may be engaged against the margin of the foremost slide 55.

Friction plugs 56 snugly engage the margins of foremost slide 55 to impositively bind it in any position to which it is moved. However, friction plugs 156 merely provide anti-skid surfaces on which rearmost slide 54 rests when the rule is held horizontally, the slide 54 being otherwise loose in its grooves 51, 53 and free of contact with slide 55. Accordingly, manipulation of either slide will not disturb the position of the other slide. Slide 54 is desirably shorter than the frame so that most of its length is within the frame even near extreme limits of its adjustment to minimize the possibility of its ends tilting upwardly to engage the undersurface of foremost slide 55 during movement thereof.

In Fig. 12 I disclose a modification of the device shown in Figs. 8 through 10 and in which there are lips 60, 61 formed on the upper and lower flanges 46, 47 and which intervene to separate the rearmost slide 54 from the foremost slide 55. In this embodiment of the invention friction plugs 100 impositively bind both slides 54, 55 to their respective groove walls.

In Fig. 11 a further modification is shown in which the upper and lower flanges 62, 63 are provided with stepped slideways 64, 65 and 66, 67 which are staggered to accommodate a foremost slide 68 and a rearmost slide 69. The slides may be of substantially equal width and both are desirably longer than the frame for finger manipulation. This construction has the advantage that a friction brake 71 mounted on flange 62 will bear against the uppermost margin of the foremost slide 68 and another friction brake 72 mounted on flange 63 will bear against the lowermost margin of the rearmost slide 69. Accordingly, in the construction shown in Fig. 11 the friction brakes 71, 72 are independently applied to the respective slides 68, 69. The brake components are given the same reference characters as in Figs. 1 and 2. The shanks of brake screws 38 are desirably threaded to their respective flanges to lock the shanks against turning with the nuts 41.

The inside face of the transparent front 45 of the frame 44 of any of the embodiments of the invention shown in Figs. 8–12 is provided with a mid-indicator line 73 corresponding to indicator line 94 of the embodiment of the invention shown in Figs. 1–7.

Friction plugs 101 impositively bind slide 69 in groove 66. Friction plugs 102 impositively bind slide 68 in groove 65. The slides are bodily held in spaced relation by the plugs to preclude interference between the slides, each of which is operated independently of the other.

In Fig. 13 a still further modification of the invention is shown in which the channel-shaped frame 74 has marginal flanges 75, 76 respectively provided with stepped slideway grooves 77, 78 and 81, 82. In this embodiment of the invention the channel web 83 forms a closed back for the frame, the front of the frame being exposed to the operator. The side margins of the wider rearmost slide 84 are exposed beyond the margins of the narrower foremost slide 85. Accordingly, slide 84 can be manipulated by grasping its exposed margins, slide 85 being manipulated by its ends or from its exposed front face. Slide 84 is desirably longer than the frame to facilitate its finger manipulation.

Where both slides 84, 85 are transparent, an indicator line corresponding to indicator line 73 of Fig. 8 could be inscribed on the inside face of the rear wall 83 of the frame. However, in this particular embodiment of the invention I show an insert member 86 which spans the space between the flanges 75, 76 and is fastened to flange 76 by screws 79. Insert 86 has inscribed on its rear face an indicator line 87. This arrangement permits slide 84 to be opaque, preferably white, with scales inscribed on both its faces. Slide 84 can thus be reversed and the number of scales carried thereon increased.

The respective slides 84, 85 are bodily separated by the lips 88, 89 formed on the flanges 75, 76 for the same purpose as flanges 60, 61 of the device shown in Fig. 12. All of the slide rule embodiments disclosed herein may at least partially be formed by extrusion. The embodiments shown in Figs. 8–12 are particularly adapted to this manufacturing process.

The various slide rule embodiments shown in this application may be manipulated in the manner described in my copending application aforesaid, the rectilinear slide rule being functionally equivalent to a circular slide rule but having the advantages of a rectilinear slide rule. It is readily apparent to one skilled in the art that all of the scales may be inscribed upon one or the other of the slides 27, 28, or their equivalent slides shown in the embodiments of the invention shown in Figs. 8 through 17, the other slide and its equivalents functioning as a cursor. For this purpose slide 28 is provided with indicator lines 92, 93 and slide 27 is provided with indicator lines 96, 97.

The following description of the operation of the slide rule will be specifically related to the embodiment shown in Figs. 1 through 7 although it is clear that the description comprehends all embodiments.

As in the device of my copending application aforesaid, I may prefer to inscribe on slide 27 all of the conventional slide rule scales, these being indicated generally by reference character 95. The slide 27 is provided with end indicator lines 96, 97 which, when the slide rule is closed, register with indicator lines 92, 93 on slide 28 which functions as a cursor.

However, to achieve certain advantages over the device of my prior application, I may optionally provide slide 28 with additional scales indicated generally by reference character 98. Accordingly, slide 28 may be regarded for some purposes as an additional scale slide. It is evident that for the purpose of solving mathematical problems as described in my copending application aforesaid, an appropriate scale on slide 28 may be used, the slide 27 being regarded as a cursor having end indicator lines 96, 97 for cooperation with the scales 98 and the fixed partition indicator line 94.

Moreover, the addition of scales 98 on slide 28 make the slide rule more flexible and adapt it for additional operations involving fewer slide manipulations than in the device disclosed in my copending application aforesaid.

As shown in Figs. 3 and 4, it is necessary to inscribe the C-scale on both of the slides 27, 28 in order to achieve certain advantages in multiplication and division. However, inasmuch as it is not necessary to repeat the other scales, these can be distributed between the upper and lower slides or additional scales can be added.

In general, the duplication of the C-scale on both slides permits the solution of single multiplication and division problems in only two moves of slide rule elements, even where the respective scales are laterally remote, and permits solution of series problems with only one movement per intermediate answer. For this purpose it is significant that the indicator lines 92, 93 on scale 28 may sweep over every value of the parallel lines of scale indicia on slide 27 and the indicator lines 96, 97 of slide 27 may sweep over every value of the parallel lines of scale indicia inscribed on the slide 28.

Inasmuch as the answers to all problems will appear in alignment with the end indicator lines or with the mid-indicator line 94, which also intersects every parallel scale line of both slides, intermediate and final answers as between scales on the two slides may be read instantly and without additional manipulation of any cursor or other slide rule element, even when the scales involved are materially laterally spaced.

A conventional Mannheim slide rule can solve single multiplication and division problems in two movements only in connection with the scales on the mid-stick and side rib which happen to be adjacent at their parting line, other scales remote from the parting line requiring an extra movement of the cursor to accurately relate values thereon. For series problems the conventional Mannheim slide rule must be provided with folded scales, such as the CI, CF, DF, CIF and DIF scales to solve problems in a sequence of movement in which there is only one movement per intermediate answer. The slide rule of the present disclosure eliminates the need for folded scales and makes the space thus saved available for other scale indicia. In the slide rule of the present invention it is significant that both slides are independently movable with respect to the frame and with respect to the mid-indicator line 94. This is not true of the conventional Mannheim type slide rule in which the scales on the side ribs are fixed with respect to the frame.

In Figs. 14 through 17 of the drawing, I have diagrammatically illustrated solution of a simple sequence problem in which the C-scale on the foremost slide 28 and its end indicator lines 92, 93 cooperate with the C-scale on the rearmost slide 27 and its end indicator lines 96, 97.

To achieve the advantages of my slide rule in which sequence problems are solved in one slide movement per intermediate answer, all problems begin and end on mid-indicator line 94. The automatic appearance of the intermediate answer on the very line with respect to which the intermediate answer has to be set for the next operation eliminates any re-setting step.

The rules for multiplication and division of series problems on my slide rule may be stated as follows: To multiply, a multiplicand on one slide is aligned with mid-indicator line 94 and the other slide is moved to align the multiplier on its scale with one of the end indicators on the same slide as the multiplicand, the product being read on the scale which was last moved, at the position of mid-indicator line 94. To divide, the dividend is aligned with mid-indicator line 94 and the divisor on the same scale is aligned with an end indicator on the other slide, the quotient being read on the mid-indicator line 94, on scale last moved.

To multiply any two numbers one may start by moving slide 28 to register one of the numbers on its C-scale with the mid-indicator line 94. Of course, the problem could be similarly started by first moving slide 27. The next step in the described sequence is to move the other slide 27 until the other number on its C-scale registers with one or the other of indicator lines, 92, 93 on slide 28. The product will appear on the C-scale of slide 27 in registry with the mid-indicator line 94.

Figure 15:
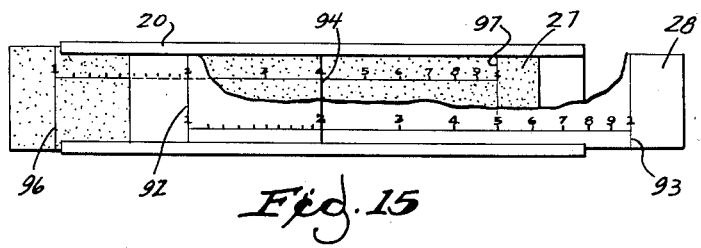

For example, to multiply "2" times "2," slide 28 is first moved to align "2" on its C-scale with the mid-indicator line 94 as shown in Fig. 14. Slide 27 is then moved to align "2" on its C-scale with the end indicator line 92 on the scale 28, the product "4" on the C-scale of slide 27 being then read on the mid-indicator line 94 as shown in Fig. 15. It will be observed that this procedure involved only two moves, the product being obtained directly on the mid-indicator line 94.

Note that in the foregoing operation setting of the number on slide 28 on the mid-indicator line establishes a fixed distance between the mid-indicator line 94 and the end indicator line 92. This is similar to the operation described in my copending application aforesaid and is analogous to the establishment of a fixed distance between the independent and non-independent indicator arms of the circular slide rule. This distance is not changed in the next subsequent manipulation of the scale 27. One cannot run off the scale if care is exercised in manipulating the scales so that the end indicator lines 92, 93 on slide 28 and the end indicator lines 96, 97 on slide 27 always straddle the mid-indicator line 94.

Figure 16:
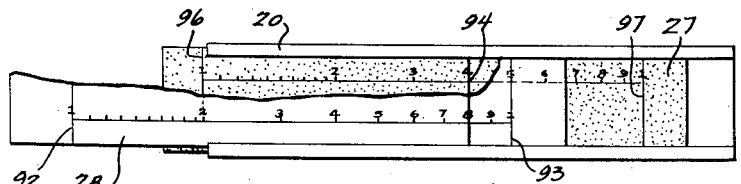

If the next multiplier in a sequence is "2," slide 28 is then moved until "2" on its C-scale is aligned with the end indicator line 96 on slide 27 and the product "8" is read on the C-scale of slide 28 in alignment with the mid-indicator line 94, all as shown in Fig. 16. Note that this result is achieved in a single movement of one of the scales, it being unnecessary to move any other cursor or other slide rule element.

If the next operation in the series is to divide, which is the converse of multiplication, the divisor is read on the same scale as the dividend, the other scale slide being moved to align an end indicator thereof with the divisor, the quotient being read on the other scale in alignment with the mid-indicator line 94. For example, if the intermediate answer "8" shown in Fig. 16 is to be divided in the next step of the sequence by "4," slide 27 is moved to its Fig. 17 position in which its end indicator line 96 aligns with the divisor "4" on the C-scale of slide 28, the quotient "2" being read on the C-scale of slide 27 in alignment with mid-indicator line 94.

It will be observed that if the intermediate answer "8" shown in Fig. 16 were to be divided by "2," the rule is already set for reading quotient "4" on mid-indicator line 94 inasmuch as the divisor "2" on the same scale as dividend "8" is aligned with end indicator line 96 of slide 27.

Figure 17:
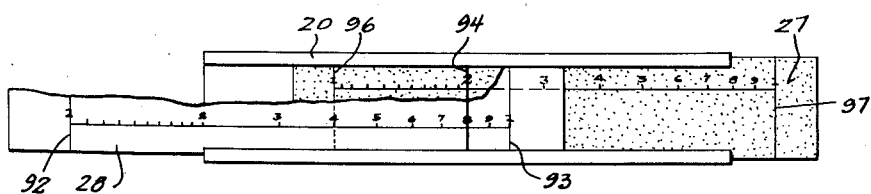

The operation of the rule is not necessarily restricted to the steps aforesaid, these being preferred, however, in the solution of series problems in that intermediate answers are obtained in single movements of one slide or the other. Figs. 16 and 17 illustrate how answers can be read on the end indicator line of the scales. For example, if the intermediate answer "8" shown in Fig. 16 is to be divided by "2," slide 27 may be moved to its Fig. 17 position in which divisor "2" on the C-scale of slide 27 registers with the mid-indicator line 94, the quotient "4" on the C-scale of slide 28 being read on end indicator line 96 on slide 27. It is often advantageous to thus read the answer under an end index line in non-series problems, especially when dealing with multiplication and division of numbers on the C-scales and values on other scales such as the Log-Log and trigonometric scales.

The foregoing examples illustrate the versatility of my improved slide rule in which scales are inscribed on both slides. It is clear that any other conventional slide rule manipulation can be performed on the slide rule herein disclosed by following the disclosed sequence. All important scales, such as the trigonometric scales S, ST and T can be duplicated on both slides and all problems involving these scales can be solved in a series of single slide movement per sequence step.

In this connection it is observed that in my slide rule embodiment having scales on both slides, reciprocals of multiplied and divided numbers appear in alignment with an end indicator line on one of the slides. As shown in Fig. 15 illustrating 2×2=4, the reciprocal .5 of 4÷2 or 2÷1 appears on scale 28 in alignment with indicator line 97 of slide 27. Also, the reciprocal 2 of 2÷4 or 1÷2 appears on scale 27 in registry with index 92 of slide 28.

In Fig. 16 illustrating 4×2=8, the reciprocal .5 of 8÷4 or 2÷1 appears on slide 27 in alignment with indicator line 93 of slide 28. Also, the reciprocal 2 of 4÷8 or 1÷2 appears on slide 28 in registry with index line 96 of slide 27. In Fig. 17 illustrating a division problem in which 8÷2=4, the reciprocal .25 of 8÷2 or 4÷1 appears on slide 27 in alignment with indicator line 93 on slide 28. Also, the reciprocal 4 of 2÷8 or 1÷4 appears on slide 28 in registry with index line 96 of slide 27. The reciprocal is obtained in the same single slide move made to obtain the product or quotient of the numbers involved.

In all cases, inasmuch as the end indicator lines 92, 93 and 96, 97 sweep over every value of the indicia on the parallel scales of the correlative slides, and the correlative slides combine the function of scale and cursor, intermediate and final answers will be obtained instantly without requiring movement of any other slide rule element.

I claim:

1. A rectilinear slide rule comprising a frame having marginal flanges, two elongated slides in substantially face to face relation, at least one of said flanges having slideways stepped laterally of the elongation of the slides and adapted to receive the edges of said slides in stepped relation to expose a marginal portion of one slide beyond a corresponding marginal portion of the other slide.

2. The device of claim 1 in which an end portion of one of said flanges is relieved to expose the stepped margins of said one slide for finger manipulation.

3. The device of claim 1 in further combination with a friction pad and means for mounting said pad for contact against an exposed margin of one of said slides.

4. The device of claim 1 in which the slides are of different widths, a margin of the wider slide extending beyond a margin of the narrower slide.

5. The device of claim 1 in which the slides are of substantially equal width, the margin of one slide being exposed at one side of the frame and the margin of the other slide being exposed at the other side of the frame.

6. The device of claim 5 in further combination with a friction brake for each slide and means mounting said brakes for engagement with the respective exposed margins of said slides.

7. A rectilinear slide rule comprising a channel-shaped frame having a web and marginal flanges provided with slideways, two elongated slides in substantially face to face relation and having side margins slidably engaged in said slideways, one of said slides being provided with a scale and the other said slide and said web being provided with indicator lines for correlation with said scale.

8. The device of claim 7 in which said web is transparent and constitutes the front of the frame, said scales being visible through said web.

9. A rectilinear slide rule comprising a frame having marginal flanges provided with slideways, a first slide spanning said flanges and having a plurality of parallel scales, a second slide spanning said flanges and having a cursor indicator line thereon which intersects all of the parallel scales on the first slide, and a relatively fixed element spanning said flanges and having a cursor indicator line thereon which intersects all of the parallel scales on the first slide, said first and second slides being relatively slidable with respect to said fixed element whereby said cursor indicator lines sweep over all of said scales in the course of relative movement between the first slide and the respective cursor indicator lines.

10. The device of claim 9 in which said second slide is provided with a scale, said first slide having two cursor indicator lines spaced apart a distance equal to the length of the scale on the second slide.

11. A rectilinear slide rule comprising a first slide having a scale, a second slide having an indicator line, said second slide being in face to face relation to the first slide, a fixed position element having an indicator line inscribed thereon, and means on which said first and second slides are mounted for rectilinear movement with respect to the fixed element.

12. The device of claim 11 in which said first and second slides are provided with corresponding scales and corresponding transverse indicator lines at the ends of said scales, the indicator lines on the first slide spanning all of the scales on the second slide and the indicator lines on the second slide spanning all of the scales on the first slide whereby an indicator line on one slide will sweep over all of the scales on the other slide and an indicator line on the other slide will sweep over all of the scales on said one slide on relative movement of said slides.

13. The device of claim 11 in which said means comprises a frame having grooved flanges in which margins of said slides are movable.

14. The device of claim 13 in which said grooved flanges comprise means for impositively binding at least one of said slides against movement therein.

15. The device of claim 13 in which said grooved flanges comprise means for holding one of said slides relatively tightly and the other of said slides relatively loosely.

16. In a rectilinear slide rule comprising a frame having marginal flanges provided with slideways and slides mounted for rectilinear movement therein, a flange thereof being provided with a recess exposing a slide margin, a friction brake mounted in said recess and comprising a fraction pad and a screw having threaded means bearing on said pad whereby to adjust the pressure between the pad and the slide.

17. A slide rule of the character described and comprising a frame having a relatively fixed mid-indicator line and two slides mounted for rectilinear movement independently of said mid-indicator line and independently of each other, said slides bearing correlative scales and corresponding end indicator lines at the ends of said scales, the respective end indicator lines and mid-indicator line transversely intersecting all of said correlative scales to sweep over all values thereof on appropriate relative rectilinear movement thereof.

No references cited.